July 22, 1924.
W. F. OSBORNE
VISCOSITY TESTING DEVICE
Filed Dec. 11, 1919
1,502,118
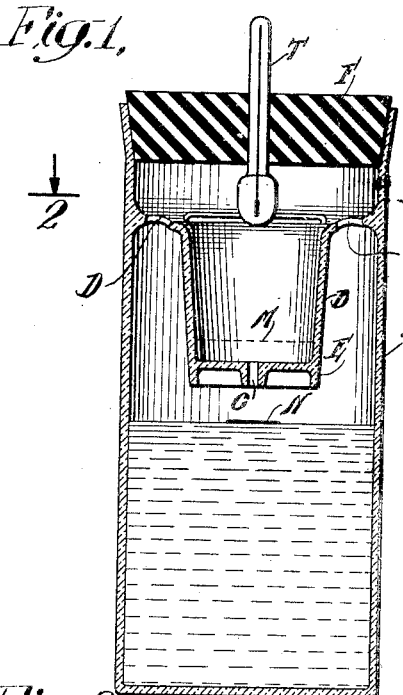
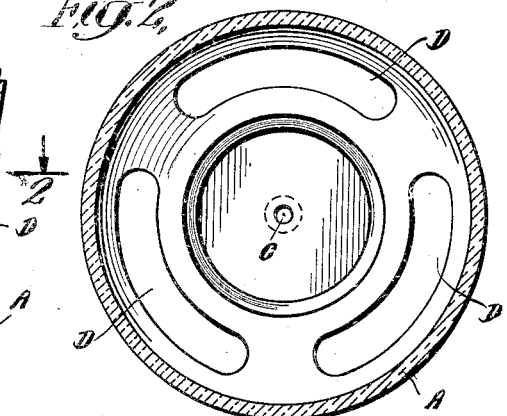
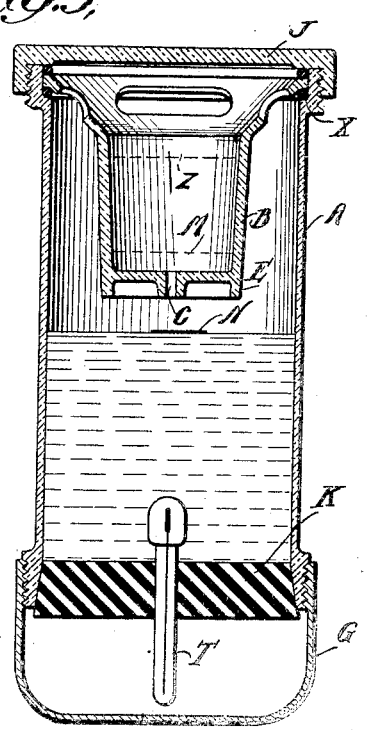
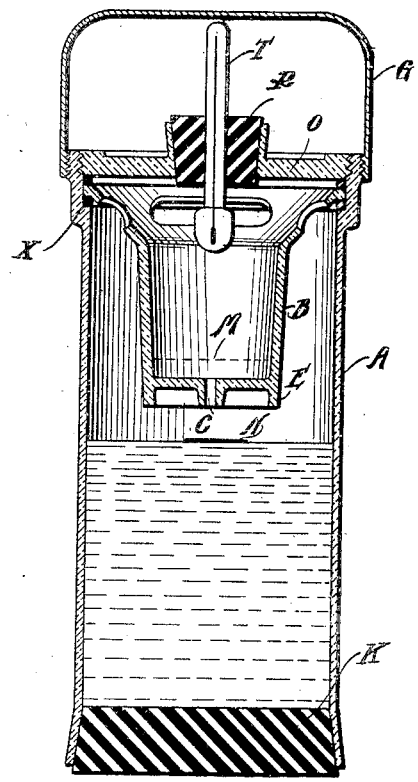
Inventor
William F. Osborne
By his Attorney Patented July 22, 1924.

1,502,118

UNITED STATES PATENT OFFICE.

WILLIAM F. OSBORNE, OF WESTWOOD, NEW JERSEY.

VISCOSITY-TESTING DEVICE.

Application filed December 11, 1919. Serial No. 344,002.

*To all whom it may concern:*

Be it known that I, WILLIAM F. OSBORNE, a citizen of the United States, residing at Westwood, in the county of Bergen and State of New Jersey, have invented certain new and useful Improvements in Viscosity-Testing Devices, of which the following is a specification.

My invention relates to liquid testing devices and particularly to such as are adapted for determining the viscosity of liquids such as oils or similar liquids.

One object of my invention is to facilitate the determination of the comparative or relative viscosities of various oils and other liquids by providing a simple and durable testing device that shall be compact in construction and reliable in operation.

Another object is to provide a viscosity tester which will be readily portable and capable of being operated accurately and conveniently by those unaccustomed to the use of laboratory instruments.

A further object is to provide a device of the aforesaid character that shall be inexpensive to manufacture and unencumbered by the numerous accessories customarily required for the scientific determination of viscosities.

A further object is to provide a testing device which will permit of the taking of several viscosities at different temperatures of the same liquid without withdrawing any of the liquid from the viscosimeter or cleaning the instrument between each test on the same liquid.

A further object is to provide a viscosity tester which may be completely submerged in a bath, thus maintaining the entire body of the liquid to be tested as well as the entire testing device at any desired temperature while the test is being made.

Further objects are to provide a viscosity testing construction in which the reading level of the liquid shall be visible from the outside, and one that shall embody means of introducing the liquid to be tested without disturbing the thermometers, etc., means of readily removing the parts requiring cleaning without disturbing the body of the liquid to be tested, means for preventing leakage of the liquid within the tester to the outside and a means for preventing any of the bath liquid in which the tester may be submerged from entering the testing device.

The low cost of manufacturing my improved device, its simplicity of design and operation, and its portability render it especially valuable to oil salesmen for comparing the relative viscosities of oils, to operating engineers or motorists for comparing the viscosities of new and used oils, and to anyone requiring a knowledge of the comparative viscosities of liquids.

My device consists essentially of a receptacle for holding the liquid to be tested and an inner measuring receptacle having an opening in one end through which the liquid to be tested will flow. There are also suitable openings between the outer and inner receptacle to permit the liquid to flow freely between them. The liquid to be tested is placed in the outer receptacle and the cover or stopper put on tightly. The device is then reversed so that the liquid will completely submerge the inner measuring receptacle flowing through the openings between the two receptacles until the space within the inner receptacle is completely filled. The viscosimeter is again reversed and the time required for the liquid in the inner measuring receptacle to flow into the outer receptacle through the opening in the bottom will represent the relative viscosity of the liquid.

A thermometer is provided to read the temperature of the liquid within the receptacle just before taking the viscosity or immediately thereafter. Suitable covers and joints are provided to prevent loss of liquid or damage to the thermometer. If the liquid is not at the desired temperature, the entire testing device may be submerged in a bath of water or oil to bring it to the correct temperature, as indicated by the thermometer. If desired the entire tester may be placed in a glass jar filled with water or other transparent liquid heated to the desired temperature, thus maintaining the device and the entire body of the liquid at the desired temperature, the viscosity reading being observed through the transparent jar, liquid bath and testing device.

In order that my invention may be thoroughly understood I will now proceed to describe the same in the following specification, and will then point out the novel features thereof in appended claims.

Referring to the drawings:

Figure 1 is a sectional elevation of a viscosity testing device arranged and constructed in accordance with my invention and constituting one embodiment thereof.

Figure 2 is a sectional plan view taken on the line 2—2 of Figure 1.

Figures 3 and 4 are views corresponding to Figure 1 of modified structures which constitute other embodiments of my invention.

Having special reference to Figure 1, A is a transparent receptacle for holding the liquid to be tested. N is a mark inscribed on the surface of the receptacle A to indicate the amount of liquid required for test. B is an inner measuring receptacle of transparent material having an opening C in the bottom through which the liquid to be tested will flow during test. M is a mark inscribed on the inner measuring receptacle B to indicate the level of the liquid at which the test is completed. There are one or more openings D between the receptacles A and B to permit the liquid to flow readily from one to the other. E is a shield to prevent the liquid flowing down the outside of the measuring receptacle B from interferring with the flow of liquid from the opening C. F is a stopper to prevent the liquid from getting out of the receptacle when the tester is upside-down and to prevent any of the surrounding bath liquid from getting into the device. T is a thermometer to take the temperature of the liquid just prior to the test.

In the Figure 3 construction the thermometer T is mounted in a stopper K at the bottom of the receptacle A and is protected by a cap G which is removably secured to the receptacle as shown in the drawing.

The inner receptacle B in this construction is removable, being clamped against an annular shoulder X of the outer receptacle A by cover J, with suitable packing washers interposed.

Referring now to Figure 4 in which like parts are designated by the same reference characters, the inner receptacle B is removably mounted as in the Figure 3 construction, but in this case a cover O takes the place of the cover J and has a stopper R therein which supports the thermometer, the cap G protects the thermometer, and in order to avoid the necessity of removing the cap G, stopper R or the cover O when it is desired to fill the receptacle, stopper K is provided at the bottom of the outer receptacle A.

To operate one of the testers illustrated the stopper F or K is removed and the liquid to be tested poured into the receptacle A until the liquid level is at mark N as shown in the drawings. The stopper is replaced and the device turned so that the end containing the inner measuring receptacle B will be down. This permits the liquid in the receptacle A to gravitate through the openings D into the measuring receptacle B completely submerging it and driving out any air entrapped through the opening C.

The device is then reversed and brought to rest on one end with the measuring receptacle B at the top. The liquid will then flow by gravity through the opening C in the bottom of the measuring receptacle B. The time required from the moment the tester is reversed to the instant the level of the liquid in the inner receptacle reaches the mark M will be an indication of the viscosity of the liquid. The excess liquid which flows out into the receptacle A through the openings D and thence down the outside of the measuring receptacle B will be deflected and prevented from interfering with the flow of liquid through the opening C by the shield E.

The temperature of the liquid at which the viscosity reading is taken will be measured by the thermometer T before the tester is reversed to start the flow of liquid through the opening C. If it is found that the temperature of the liquid to be tested is not as desired, the entire testing device may be submerged in a heating bath, until brought to the desired temperature. If desired the device may remain in the bath throughout the entire test the viscosity reading being made by observing the flow of liquid through the transparent walls of the testing receptacle and the bath liquid.

In Figure 3 a mark Z is also inscribed near the top of the measuring receptacle B. This mark may be used to indicate the starting of the test, thus insuring a positive starting level as well as finishing level and a uniform head for the flow of liquid through the opening C. A similar mark may of course be employed on any form or embodiment of the invention.

What I claim is:

1. In a viscosity testing device, the combination of an outer receptacle for holding the liquid to be tested and an inner measuring receptacle having an opening in the bottom through which the liquid to be tested will flow, and having upper openings connecting the inner and outer receptacles permitting the liquid to flow freely from one to the other.

2. In a viscosity testing device, the combination of a transparent outer receptacle for holding the liquid to be tested and a transparent inner measuring receptacle having an opening in the bottom through which the liquid to be tested will flow, and having upper openings connecting the inner and outer receptacles permitting the liquid to flow freely from one to the other.

3. In a viscosity testing device, the combination of a transparent outer receptacle for holding the liquid to be tested having a cover or stopper and suitable joints to prevent leakage of liquid from within to the outside, or from without to the inside, and a transparent inner measuring receptacle having an opening in the bottom through which the liquid to be tested will flow and having upper openings connecting the outer and inner receptacle permitting the liquid to flow freely from one to the other.

4. In a viscosity testing device, the combination of a transparent outer receptacle for holding the liquid to be tested having a cover or stopper and suitable joints to prevent leakage of liquid from within to the outside, or from without to the inside, provided with a thermometer and suitable means for holding same, and a transparent inner measuring receptacle having an opening in the bottom through which the liquid to be tested will flow and having upper openings connecting the outer and inner receptacles permitting the liquid to flow from one to the other.

5. In a viscosity testing device, the combination of a transparent outer receptacle for holding the liquid to be tested having a cover or stopper and suitable joints to prevent leakage of liquid from the inside to the outside, or from without to the inside, and a transparent inner measuring receptacle having an opening in the bottom through which the liquid to be tested will flow, a mark inscribed on it to indicate the level of the liquid when the test is to be started, a mark to indicate the level of the liquid when the test is completed, and having upper openings connecting the inner and outer receptacles permitting the liquid to flow freely from one to the other.

6. In a viscosity testing device, the combination of a transparent outer receptacle for holding the liquid to be tested having a cover or stopper and suitable joints to prevent leakage of the liquid from the inside to the outside, or from without to the inside, and a transparent inner measuring receptacle having an opening in the bottom through which the liquid to be tested will flow, marks inscribed on it to indicate the level of the liquid when the test is to be started and the level of the liquid at which the test is completed, a curtain or shield attached to the lower portion to prevent the flow of liquid down the outside of the measuring receptacle from interfering with the flow of liquid through the opening in the bottom, and having upper openings connecting the inner and outer receptacles permitting the liquid to flow freely from one to the other.

7. In a viscosity testing device, the combination of a transparent outer receptacle for holding the liquid to be tested, a removable transparent inner measuring receptacle having an opening in the bottom through which the liquid to be tested will flow and having upper openings between the inner and outer receptacles to permit the liquid to flow from one to the other, and removable cover or stopper and suitable joints to prevent leakage of liquid from within to the outside and from without to the inside.

8. In a viscosity testing device, the combination of a transparent outer receptacle for holding the liquid to be tested having inscribed on its surface a mark to indicate the quantity of liquid required for test, and a transparent inner measuring receptacle provided with an opening in the bottom through which the liquid to be tested will flow, and having upper openings between the outer and inner receptacles permitting the liquid to flow freely from one to the other.

9. In a viscosity testing device, the combination of a transparent outer receptacle for holding the liquid to be tested, having a cover or stopper provided with a thermometer and means for holding same without leakage of liquid, a removable cover to protect the thermometer against damage, and a transparent inner measuring receptacle having an opening in the bottom through which the liquid to be tested will flow and having upper openings connecting the inner and outer receptacles permitting the liquid to flow from one to the other.

10. In a viscosity testing device, the combination of a transparent outer receptacle for holding the liquid to be tested, having a removable cover or stopper with a thermometer and protecting cover at one end, a transparent inner measuring receptacle having an opening in the bottom through which the liquid to be tested will flow, and a cover or stopper at the other end to permit filling the viscosimeter with the liquid to be tested without removing the inner receptacle or the cover containing the thermometer.

11. In a viscosity testing device, the combination of an outer receptacle for holding the liquid to be tested and an inner measuring receptacle having a flange at its upper end connected to the walls of the outer receptacle, there being an opening in the bottom of the inner receptacle through which the liquid to be tested will flow, and there being also openings in the flange connecting the inner and outer receptacles permitting the liquid to flow freely from one to the other.

12. A viscosity testing device comprising a container, a measuring receptacle therein, having relatively large upper openings for filling the measuring receptacle from the body of the container and a relatively small bottom discharge opening to introduce a time element in the outflow of liquid from the measuring receptacle back into the container.

13. A viscosity testing device comprising a transparent container having a removable stopper to permit liquid to be supplied thereto, an inner measuring receptacle supported in the container near the top, upper openings for filling the measuring receptacle from the body of liquid in the container, and a small bottom opening for permitting the liquid to discharge from the measuring receptacle.

14. A viscosity testing device comprising a container, an inner measuring receptacle removably secured at the top of the container and suspended therein, upper openings for permitting liquid to flow freely into the measuring receptacle when the container is inverted and a small bottom discharge opening from the inner receptacle to the container.

15. A viscosity testing device comprising a container having a removable bottom, a measuring receptacle suspended within the container from the top, a cover supporting a thermometer to project into the measuring receptacle and means for permitting the rapid flow of fluid into the measuring receptacle when the container is inverted and for allowing the liquid to flow slowly back into the container when it is returned to its upright position.

16. A viscosity testing device comprising a container for holding the fluid to be tested and having an opening through which the fluid is supplied, means for sealing said opening after the fluid is introduced; a measuring receptacle disposed entirely within said container at one end thereof and constructed and arranged to be filled with fluid from said container when the testing device is inverted in position and to permit the oil to flow slowly back into the container when the device is restored to its initial position.

17. A portable self-contained viscosity testing device comprising a transparent container for holding a predetermined quantity of the fluid to be tested and having an opening therein through which the fluid is supplied, means for sealing said opening after the fluid is introduced, a transparent measuring receptacle disposed entirely within said container and so located therein as to be free of the oil to be tested when the testing device is in its normal upright position, said measuring receptacle being supported from said container to permit the receptacle to be filled with fluid when the testing device is inverted in position and provided with a restricted bottom opening through which the fluid flows slowly back into the container when the testing device is restored to its upright position.

18. A viscosity testing device comprising an enclosed receptacle embodying an upper measuring chamber for holding a predetermined amount of fluid to be tested and a lower chamber for receiving the fluid from the upper chamber, said structure including an orifice for discharging the measured fluid from the upper chamber into the lower chamber when the device is in upright operative position and said structure including a separate communicating passage adapted to permit the return of the fluid from the lower chamber to the upper chamber when the device occupies an inverted inoperative position.

19. A viscosity testing device comprising a closed receptacle having a wall dividing it into an upper measuring chamber for holding a predetermined quantity of fluid to be tested and a lower chamber for receiving the discharged fluid under test, said wall being provided with a restricted orifice for discharging the fluid from the upper into the lower chamber when the device occupies an upright operative position and being provided with a separate communicating passage for permitting the fluid in the lower receiving chamber to flow back into the upper chamber when the device is inverted in position.

In witness whereof I have hereunto set my hand this fourth day of December 1919.

WILLIAM F. OSBORNE.